(12) United States Patent
Wang et al.

(10) Patent No.: US 9,950,319 B2
(45) Date of Patent: Apr. 24, 2018

(54) HIGH EXCHANGE-CAPACITY ANION EXCHANGE RESIN WITH DUAL FUNCTIONAL-GROUPS AND METHOD OF SYNTHESIS THEREOF

(71) Applicants: NANJING UNIVERSITY, Nanjing, Jiangsu (CN); Nanjing Univ. Yancheng Environmental Protection Technology and Engineering Research Inst., Yancheng, Jiangsu (CN)

(72) Inventors: Jinnan Wang, Jiangsu (CN); Yi Wang, Jiangsu (CN); Xin Yang, Jiangsu (CN); Cheng Cheng, Jiangsu (CN); Chen Chen, Jiangsu (CN)

(73) Assignees: NANJING UNIVERSITY, Nanjing, Jiangsu (CN); NANJING UNIVERSITY YANCHENG ENVIRONMENTAL PROTECTION TECHNOLOGY AND ENGINEERING RESEARCH INSTITUTE, Yancheng, Jiangsu (CN)

( * ) Notice: Subject to any disclaimer, the term of this patent is extended or adjusted under 35 U.S.C. 154(b) by 0 days.

(21) Appl. No.: 15/511,184

(22) PCT Filed: Jul. 13, 2015

(86) PCT No.: PCT/CN2015/083880
§ 371 (c)(1),
(2) Date: Mar. 14, 2017

(87) PCT Pub. No.: WO2016/008396
PCT Pub. Date: Jan. 21, 2016

(65) Prior Publication Data
US 2017/0259255 A1    Sep. 14, 2017

(30) Foreign Application Priority Data
Jul. 15, 2014 (CN) .......................... 2014 1 0335922

(51) Int. Cl.
B01J 41/13 (2017.01)
C08F 8/44 (2006.01)
C08F 212/36 (2006.01)

(52) U.S. Cl.
CPC ................. B01J 41/13 (2017.01); C08F 8/44 (2013.01); C08F 212/36 (2013.01)

(58) Field of Classification Search
CPC ............ B01J 41/13; C08F 8/44; C08F 212/36
USPC ......................................................... 521/32
See application file for complete search history.

(56) References Cited

FOREIGN PATENT DOCUMENTS

| CN | 101781381 A | * | 7/2010 |
| CN | 103301890 A | * | 9/2013 |
| CN | 103524657 A | * | 1/2014 |

OTHER PUBLICATIONS

Guomin Cao et al., "Treatment of Groundwater Contaminated by Nitrate with Ion Exchange Processes", Water Purification Technology 2011, Issue No. 30, vol. 5, p. 90-94.

* cited by examiner

*Primary Examiner* — Michael M Bernshteyn
(74) *Attorney, Agent, or Firm* — Novick, Kim & Lee, PLLC; Allen Xue

(57) ABSTRACT

The present disclosed are a high exchange-capacity anion exchange resin with dual functional-groups and method of synthesis thereof. The invention relates to the field of environmental function material synthesis and application. The resin is based on chloromethylated polystyrene-divinylbenzene polymer as matrix, and by primary amination and quaternization, yields an anion exchange resin with dual functional-groups having both a weak base anionic group and a strong base anionic group. The anion exchange resin not only has high adsorption capacity for water-born nitrate ions, but also can effectively squelch natural organic acids such as phytic acid in water, thus simultaneously removing nitrate ions and phytic acid organic matter from water. Therefore, the resin has a broad application potential in the fields of drinking water treatment, groundwater remediation, and advanced urban sewage treatment.

8 Claims, 3 Drawing Sheets

HIGH EXCHANGE-CAPACITY ANION EXCHANGE RESIN WITH DUAL FUNCTIONAL-GROUPS AND METHOD OF SYNTHESIS THEREOF

FIELD

The invention discloses an anion exchange resin and method of synthesis thereof, more specifically, a high exchange-capacity anion exchange resin with dual functional-groups and method of synthesis thereof, wherein chloromethylated polystyrene-divinylbenzene polymer serves as matrix, and by primary amination and quaternization, yields the high exchange-capacity anion exchange resin with dual functional-groups, and method of synthesis thereof.

BACKGROUND

In recent years, water resources, especially groundwater resources have experienced serious pollution, resulting in various direct or latent harm and threats to ecological systems and humans. Among these harm and threats, the heavy use of nitrogen fertilizer in agriculture and the discharge of nitrogen-containing have led to increased concentration of nitrate ion that well exceeded the threshold of waterbody self-purification. Excessive intake of nitrate ions by humans may cause serious health problems, such as birth defects, diarrhea, abdominal pain, diabetes, high blood pressure. Removing nitrate ions from water is of significant benefits. Commonly used methods for removing nitrate ions from water includes mainly biochemical method, chemical reduction method, electro-osmosis method, and adsorption method. The biochemical method has a relatively long processing cycle, and its outcome is heavily seasonally dependent. The chemical reduction method requires finicky conditions, making it difficult for large-scale application. The electro-osmosis method comes with a high processing cost that render it unfit for long-term use. The ion exchange and absorption method is considered the ideal solution because of the advantages of being simple, fast and efficient, low cost, and renewable. Guoming Cao and others have achieved relatively good result using a strong base anion exchange resin in treatment of nitrate contamination of groundwater, (Guoming cao, Mei Sheng, YuLei Fei, Kerwei, Weiwei Shi, and Yifeng Yu, ion exchange method by continuous flow process in treatment of nitrate contaminated groundwater, Water Purification Technology, 2011, 30 (5): 90-94). On the other hand, organic matter in urban sewage, wastewater, biochemical tail water, or natural waterbodies, are mainly of plant type, which produce undesirable odor and smell, degrade water quality, and generate disinfection byproducts harmful to human health during water disinfection treatment process. The prevailing effective adsorbent material for removing this type of natural organic matter is weak base anion exchange resin.

Typically, the functional group in an anion exchange resin is amino group or quaternary ammonium group, the adsorption capacity for nitrate ions is controlled by the number of functional groups in resin surface. Traditionally, in chloromethylated polystyrene-divinylbenzene polymer, when undergoing quaternization, each chloromethyl within the polymer can produce only one quaternary ammonium group. The chloromethyl content within chloromethylated polystyrene-divinylbenzene polymer is fixed (16-20% by mass) and resistant to enhancement. This results in the number of quaternary ammonium salt group in the resin surface being impervious to enhancement since it is limited by the number of chloromethyl. Therefore, it remains a difficult challenge to increase the number of the quaternary ammonium salt groups deriving from the chloromethyl on the chloromethylated polystyrene-divinylbenzene polymer.

DESCRIPTIONS

1. The Technical Challenge Intended to be Solved by the Invention (1) The existing ion exchange resin for removing nitrate ions in water are predominantly strong base type anion exchange resin, wherein the adsorbing capacity for nitrate ion depends on the number of amino/amine groups on the ion exchange resin, since the nitrate ions preferably undergo ion exchange with the strong base type ion exchange groups before the weak base type ion exchange groups. However, under the traditional synthesis process of the strong base type anion exchange resin with polystyrene-divinylbenzene as matrix, each chloromethyl can only be grafted with one quaternary ammonium salt group during the quaternization reaction of the chloromethylated polystyrene-divinylbenzene polymer. This limits the number of strong base type ion exchange groups on the resin surface, as a result the adsorption capacity for nitrate ion is resistant to significant improvement. Therefore, increasing the number of ion exchange groups within an ion exchange resin is the first technical challenge to be solved.

(2) Natural waterbodies or wastewater generally contains the phytic acid type of natural organic matter (tannic acid, gallic acid). These natural organic matter not only react with the amino/amine groups of the anion exchange resin and compete with nitrate ions for adsorption resulting in decreased adsorption capacity for nitrate ions, but also generate disinfection byproducts during water disinfection treatment process that is harmful to human health. At present, the absorbing material that can effectively adsorb and remove phytic acid organic matter in water is predominantly the weak base type ion exchange resin containing primary amine, secondary amine and tertiary amine group, because the phytic acid preferably reacts with the weak base type ion exchange group over the strong base ion exchange group. Therefore, the simultaneous introduction of the weak base type ion exchange groups into the strong base type ion exchange resin, the preferential adsorption of phytic acid type of matter in water, to ensure that a sufficient number of the strong base type ion exchange groups to be present within the resin to react with nitrate ions, are another technical challenge that needs to be solved.

(3) The conventional anion exchange resin synthesis method usually employs chloromethylated polystyrene-divinylbenzene to undergo amination reaction with dimethylamine, or to undergo quaternization reaction with trimethylamine. For the anion exchange resin produced by this method, a further increase the amino or quaternary ammonium salt groups within the resin becomes difficult to achieve. This is also a technical challenge that needs to be solved.

In view of the above three challenges, the present invention provides a high exchange-capacity anion exchange resin containing dual functional-groups of a strong base type ion exchange group and a weak base ion exchange group, and a method of synthesis thereof. The synthesis method is simple and easy to operate, and can introduce weak base type and strong base type ion exchange group simultaneously onto the chloromethyl group of chloromethylated polystyrene-divinylbenzene polymer, which significantly improves the ion exchange capacity of the resin. Not only the resin's adsorption capacity for nitrate ions is significantly improved, but also the weak base type ion exchange group can contribute to the removal of the phytic acid type organic matter in water, reducing the competitive effect of the phytic acid on the removal of nitrate ions during adsorption processes.

2. Technical Solutions

A high exchange-capacity anion exchange resin with dual functional-groups uses chloromethylated polystyrene-divinylbenzene polymer as matrix. The high exchange-capacity anion exchange resin with dual functional-groups has a total exchange capacity of 6.3~7.9 mmol/g, wherein the strong base exchange capacity is 3.8~4.7 mmol/g, the weak base exchange capacity is 2.5~3.2 mmol/g, and the average particle diameter of the resin is 550~650 μm. Primary amine, serving as weak base anion exchange group, is first grafted onto the chloromethylated polystyrene-divinylbenzene polymer matrix; 3-chloro-2-hydroxypropyltrimethylammonium chloride, serving as strong base anion exchange group, is subsequently grafted onto the primary amine, yielding the high exchange-capacity, dual functional-groups anion exchange resin having both weak base and strong base anion exchange groups, and having the general formula I:

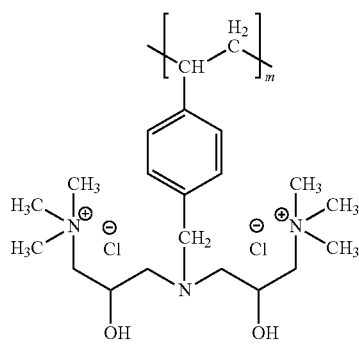

Formula I wherein, m is the degree of polymerization and within the range of 3000 to 5000, as determined by gel permeation chromatography. The determination can be performed in accordance with reference "Ersi Yang, Determination of Molecular Weight and Distribution of High Impact Polystyrene by Gel Permeation Chromatography. Jilin Chemical Science and Technology, 1997, 2: 26-28", the content of which is incorporated in its entirety.

A high exchange-capacity anion exchange resin with dual functional-groups is synthesized by using chloromethylated polystyrene-divinylbenzene polymer as matrix, introducing weak base ion exchange group (primary amine) to the matrix, further introducing strong base ion exchange group (quaternary ammonium salt group), and yielding a novel dual functional-groups anion exchange resin. The synthesis process is further illustrated infra.

Step 1:

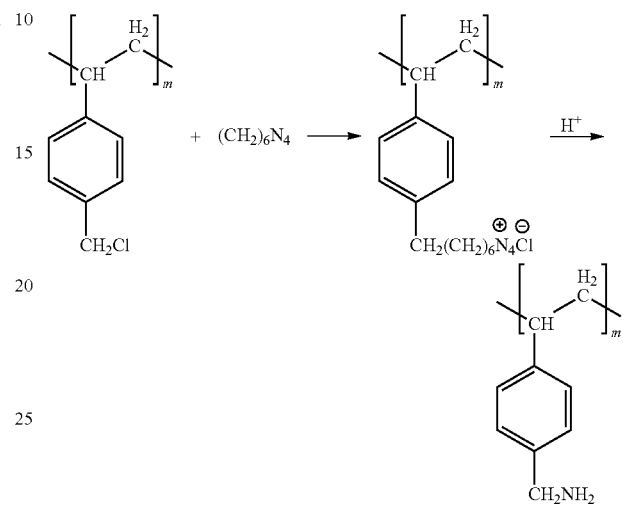

Step 2:

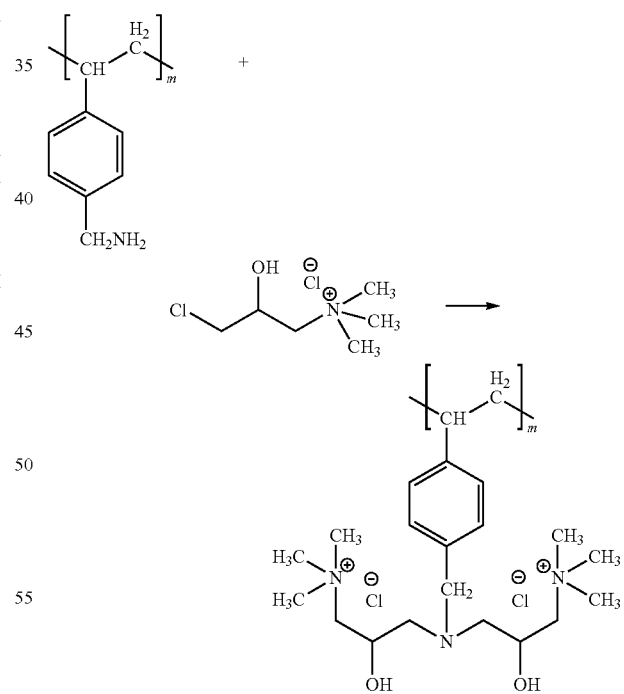

In one embodiment of the invention, the detailed synthesis steps are:

(1) Primary Amination Reaction

Into a mixed solution of anhydrous ethanol and chloroform, chloromethylated polystyrene-divinylbenzene polymer was dissolved to swell, hexamethylenetetramine was added, the reaction mixture was stirred at 35-45° C. for 6-7 hours; the polymer was filtered, washed with ethanol, and placed into a mixed acid solution of concentrated hydrochloric acid-anhydrous ethanol, with the chloromethylated polystyrene-divinylbenzene polymer (g):mixed acid solution (ml)=1:4-5, the reaction was kept at 35-45° C. for 2-3 hours, the polymer was filtered again, washed with water, NaOH solution was added to keep pH>14 to transition for 2-3 hours, washed with water, and filtered to afford the poly(divinylbenzene-vinylbenzyl amine) polymer;

(2) Quaternization Reaction

To a mixed solution formulation of 3-chloro-2-hydroxypropyltrimethylammonium chloride aqueous solution and NaOH, the poly(divinylbenzene-vinylbenzyl amine) polymers from step (1) is added, with the poly(divinylbenzene-vinylbenzyl amine) polymers (g):the mixed solution formulation (ml)=1-2:50, the reaction mixture was stirred at 70-80° C. for 2-3 hours, the product was washed with 10-30% HCl solution and deionized water, dried in vacuum at 40-60° C., to afford high exchange-capacity anion exchange resin with dual functional-groups.

In one embodiment, in the step (1) above, into a mixed solution of anhydrous ethanol and chloroform, chloromethylated polystyrene-divinylbenzene polymer was dissolved to swell at 20-25° C. for for 3-4 hours; with the ratio of chloromethylated polystyrene-divinylbenzene polymer (g): anhydrous ethanol (ml):chloroform (ml):hexamethylenetetramine (g) being equal to 5:15~20:2~4:4~5.

In another embodiment, in the step (1) above, the mixed acid solution of concentrated hydrochloric acid-anhydrous ethanol is a mixed acid solution formulation of 37.5% (mass %) concentrated HCl mixed with anhydrous ethanol, with concentrated HCl (ml):anhydrous ethanol (ml) in the range of 1:2-3.

In still another embodiment, in the step (1) above, NaOH solution was added to keep pH>14 to transition for 2-3 hours, wherein the NaOH solution is 1% (mass %).

In yet another embodiment, the 3-chloro-2-hydroxypropyltrimethylammonium chloride aqueous solution in the step (2) is 60% (mass %), the NaOH solution is 40% (mass %), and the ratio between the 3-chloro-2-hydroxypropyltrimethylammonium chloride aqueous solution and the NaOH solution is 8-10:1 in volume; the vacuum drying step is performed under the pressure of −0.09~−0.08 MPa for 12-24 hours.

3. Beneficial Effects

The present invention provides synthesis method for a high exchange-capacity anion exchange resin with dual functional-groups, in which the total exchange capacity reaches 6.3~7.9 mmol/g, wherein the strong base exchange capacity is 3.8~4.7 mmol/g, the weak base exchange capacity is 2.5~3.2 mmol/g. The absorption material comprises both a weak base type anion exchange group and a strong base anion exchange group, thus enabling the removal of phytic acid type of organic matter via the weak base type anion exchange group while simultaneous removing of nitrate ions, and achieving dual functionalization in the real-life water treatment process. The invention has a broad application potential in the fields of drinking water treatment, groundwater remediation, and advanced urban sewage treatment.

EXAMPLES

Figure 1:
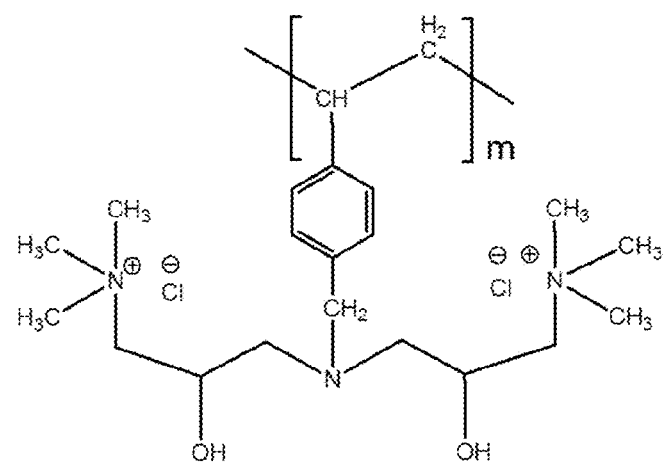
FIG. 1 is a molecular formula of the high exchange-capacity anion exchange resin with dual functional-groups prepared by the examples 1-12 of the present invention.

The invention is now further described by reference to the following examples which are intended to illustrate, not to limit the scope of the invention.

Example 1

A method for synthesizing a high exchange-capacity anion exchange resin with dual functional-groups, comprising the steps of:

1) Primary Amination Reaction 5 g of chloromethylated polystyrene-divinylbenzene polymer (degree of polymerization m=3000) was placed into stirred solution of 15 ml anhydrous ethanol and 2 ml chloroform, swell at 20° C. for 3 hours, 4 g of hexamethylenetetramine was added, the reaction mixture was stirred at 35° C. for 6 hours. The polymer was filtered and washed with ethanol. Concentrated hydrochloric acid (37.5% mass percentage) and anhydrous ethanol was mixed into an acid hydrolysis solution, with the concentrated hydrochloric acid volume (ml):anhydrous ethanol volume (ml)=1:2. The polymer was added to the acid hydrolysis solution, with the chloromethylated polystyrene-divinylbenzene polymer (g): acid hydrolysis solution (ml)=1:4. React at 35° C. for 2 hours. The polymer was filtered, washed with water, allowed to transition for 2-3 hours with 1% NaOH solution added to control pH>14, washed with water, and filtered to afford poly(divinylbenzene-vinylbenzyl amine) polymer;

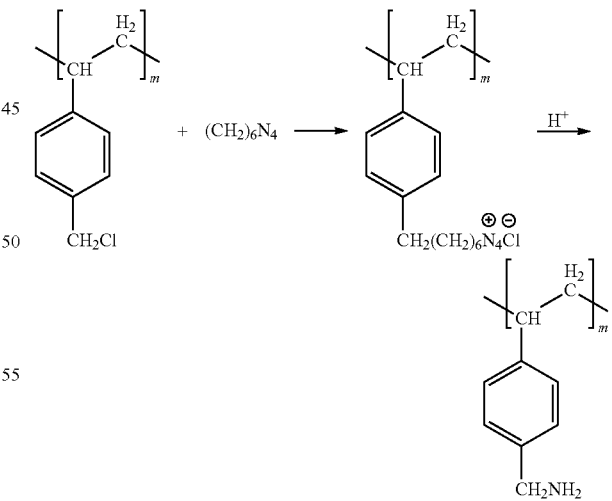

2) Quaternization Reaction

60% 3-chloro-2-hydroxypropyltrimethylammonium chloride aqueous solution and 40% NaOH solution were mixed, the ratio of the two solutions being 8:1 (volume: volume). The poly(divinylbenzene-vinylbenzyl amine) polymer from the step 1) is added into the mixed solution, at the ratio of polymer (g):mixed solution (ml)=1:50, stired at 70° C. for two hours. The reaction product was washed with 10% hydrochloric acid and deionized water, dried at 40° C. in vacuum for 12 hours (pressure −0.09 Mpa) to afford the high exchange-capacity anion exchange resin with dual functional-groups.

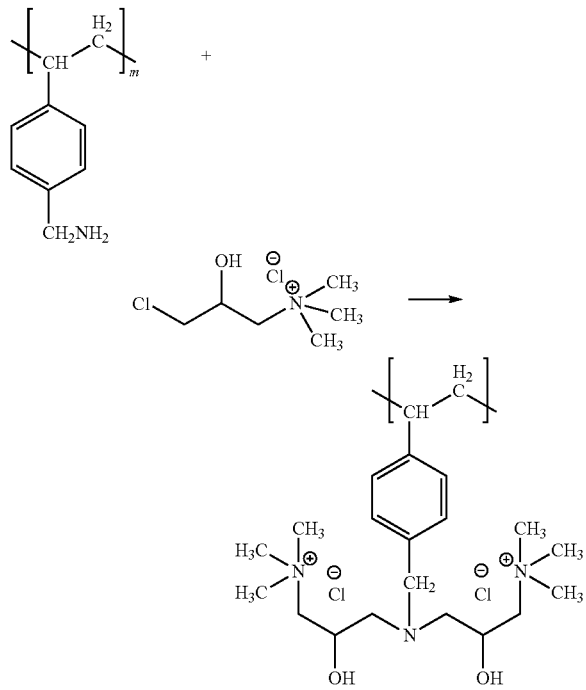

In test, the maximum adsorption capacity for nitrate ion was 198.5 mg/g, the maximum adsorption capacity for tannic acid was 493.7 mg/g, and the maximum adsorption capacity for gallic acid was 407.6 mg/g. The total exchange capacity of the resin was 7.9 mmol/g, with a strong base exchange capacity of 4.7 mmol/g, a weak base exchange capacity of 3.2 mmol/g, and an average resin particle size of 550 μm.

FIG. 1 is a structure diagram of the high exchange-capacity anion exchange resin with dual functional-groups prepared from a method described in Example 1.

Figure 2:
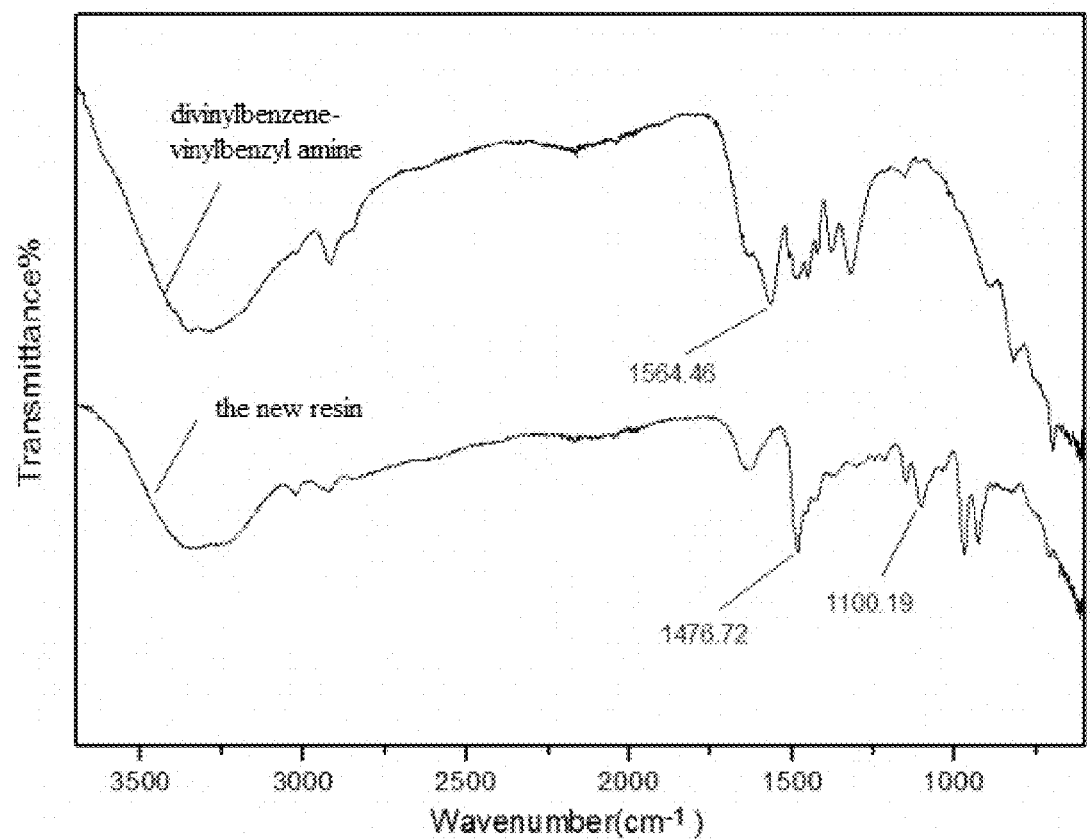
FIG. 2 is a FT-IR spectrum of the high exchange-capacity anion exchange resin with dual functional-groups (i.e., the new resin in the Figure) prepared in Example 1. The x-axis is the wave number and the y-axis the transmittance. The chart represents transmittance of various infrared light for samples.
Figure 3:
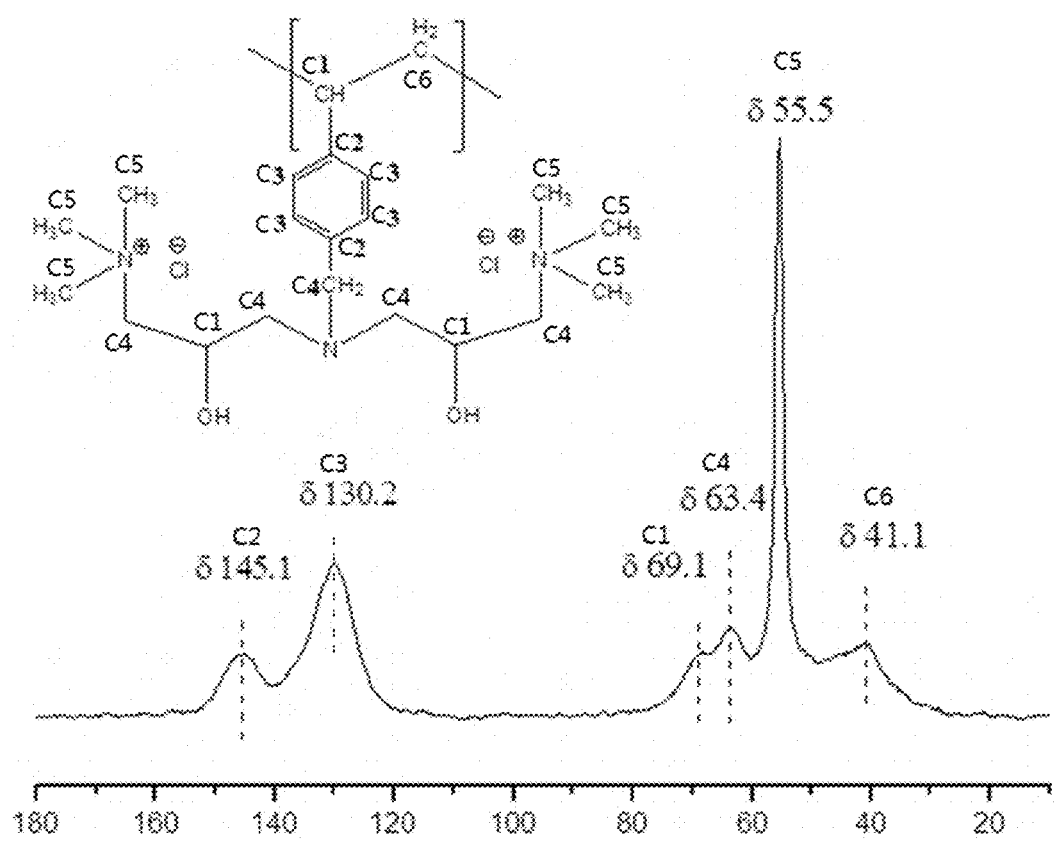
FIG. 3 is a solid nuclear magnetic resonance spectrum of the high exchange-capacity anion exchange resin with dual functional-groups prepared in Example 1. The x-axis is chemical shift.
Figure 4:
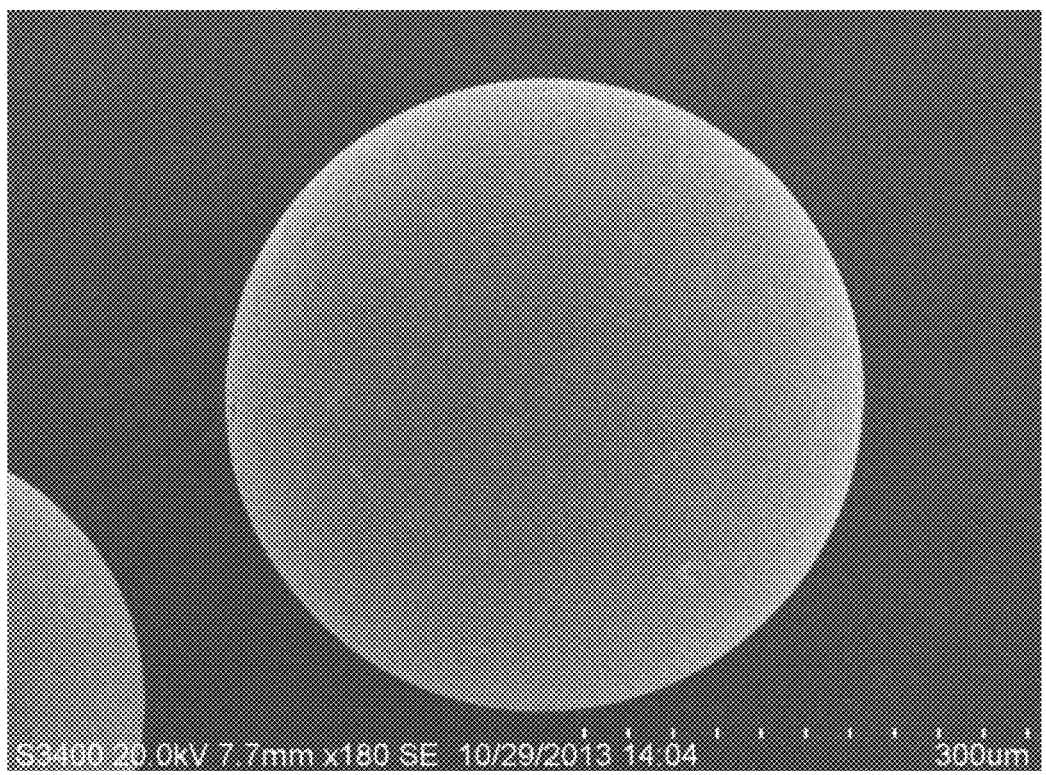
FIG. 4 is a scanning electron micrograph of the high exchange-capacity anion exchange resin with dual functional-groups prepared in Example 1.

FIG. 2 is the FT-IR spectrum of the high exchange-capacity anion exchange resin with dual functional-groups prepared from method described in Examples of present invention. In the spectrum of poly(divinylbenzene-vinylbenzyl amine) polymer, the absorption peak of N—H bending vibration in —NH$_2$ is shown at 1564 cm$^{-1}$, indicating that the primary amine group has been successfully grafted in the reaction step 1; in the infrared spectrum of the new resin (the high exchange-capacity anion exchange resin with dual functional-groups prepared in the examples of the present invention), the absorption peak of the –NH$_2$ almost disappeared, in its place a strong absorption peak at 1476 cm$^{-1}$ appeared, precisely corresponding to the bending vibration of N—CH$_3$ in the trimethylammonium chloride group. Meanwhile the emerging absorption peak at 1100 cm$^{-1}$ corresponds to the stretching vibration of C—O. FIG. 3 is a solid nuclear magnetic resonance spectrum of high exchange-capacity anion exchange resin with dual functional-groups prepared from the examples of the current invention. Combining infrared spectroscopy analysis from FIG. 2 and NMR analysis from FIG. 3 can confirm the structure of the high exchange-capacity anion exchange resin with dual functional-groups as shown in FIG. 1. FIG. 4 is a scanning electron micrograph of the high exchange-capacity anion exchange resin with dual functional-groups prepared from the examples of the present invention.

Example 2

A method for synthesizing a high exchange-capacity anion exchange resin with dual functional-groups, comprising the steps of:

1) Primary Amination Reaction 5 g of chloromethylated polystyrene-divinylbenzene polymer (degree of polymerization m=3530) was placed into stirred solution of 15 ml anhydrous ethanol and 2 ml chloroform, swell at 20° C. for 3 hours, 4 g of hexamethylenetetramine was added, the reaction mixture was stirred at 35° C. for 6 hours. The polymer was filtered and washed with ethanol. Concentrated hydrochloric acid (37.5% mass percentage) and anhydrous ethanol was mixed into an acid hydrolysis solution, with the concentrated hydrochloric acid volume (ml): anhydrous ethanol volume (ml)=1:2. The polymer was added to the acid hydrolysis solution, with the chloromethylated polystyrene-divinylbenzene polymer (g): acid hydrolysis solution (ml)=1:4. React at 35° C. for 2 hours. The polymer was filtered, washed with water, allowed to transition for 2-3 hours with 1% NaOH solution added to control pH>14, washed with water, and filtered to afford poly(divinylbenzene-vinylbenzyl amine) polymer;

2) Quaternization Reaction

60% 3-chloro-2-hydroxypropyltrimethylammonium chloride aqueous solution and 40% NaOH solution were mixed, the ratio of the two solutions being 9:1 (volume: volume). The poly(divinylbenzene-vinylbenzyl amine) polymer from the step 1) is added into the mixed solution, at the ratio of polymer (g):mixed solution (ml)=1.5:50, stired at 75° C. for 2.5 hours. The reaction product was washed with 20% hydrochloric acid and deionized water, dried at 50° C. in vacuum for 18 hours (pressure −0.085 Mpa) to afford the high exchange-capacity anion exchange resin with dual functional-groups.

The synthezied resin has characteristics significantly similar to that from Example 1. The maximum adsorption capacity for nitrate was 173.3 mg/g, the maximum adsorption capacity for tannic acid was 466.5 mg/g, and the maximum adsorption capacity for gallic acid was 379.2 mg/g. The total exchange capacity of the resin was 6.6 mmol/g, with a strong base exchange capacity of 3.9 mmol/g, a weak base exchange capacity of 2.7 mmol/g, and an average resin particle size of 600 μm.

Example 3

A method for synthesizing a high exchange-capacity anion exchange resin with dual functional-groups, comprising the steps of:

1) Primary Amination Reaction 5 g of chloromethylated polystyrene-divinylbenzene polymer (degree of polymerization m=3870) was placed into stirred solution of 15 ml anhydrous ethanol and 2 ml chloroform, swell at 20° C. for 3 hours, 4 g of hexamethylenetetramine was added, the reaction mixture was stirred at 35° C. for 6 hours. The polymer was filtered and washed with ethanol. Concentrated hydrochloric acid (37.5% mass percentage) and anhydrous ethanol was mixed into an acid hydrolysis solution, with the concentrated hydrochloric acid volume (ml):anhydrous ethanol volume (ml)=1:2. The polymer was added to the acid hydrolysis solution, with the chloromethylated polystyrene-divinylbenzene polymer (g): acid hydrolysis solution (ml)=1:4. React at 35° C. for 2 hours. The polymer was filtered, washed with water, allowed to transition for 2-3 hours with 1% NaOH solution added to control pH>14, washed with water, and filtered to afford poly(divinylbenzene-vinylbenzyl amine) polymer;

2) Quaternization Reaction

60% 3-chloro-2-hydroxypropyltrimethylammonium chloride aqueous solution and 40% NaOH solution were mixed, the ratio of the two solutions being 10:1 (volume: volume). The poly(divinylbenzene-vinylbenzyl amine) polymer from the step 1) is added into the mixed solution, at the ratio of polymer (g):mixed solution (ml)=2:50, stired at 80° C. for 3 hours. The reaction product was washed with 30% hydrochloric acid and deionized water, dried at 60° C. in vacuum for 24 hours (pressure −0.085 Mpa) to afford the high exchange-capacity anion exchange resin with dual functional-groups.

The synthezied resin has characteristics significantly similar to that from Example 1. The maximum adsorption capacity for nitrate ion was 175.1 mg/g, the maximum adsorption capacity for tannic acid was 468.7 mg/g, and the maximum adsorption capacity for gallic acid was 381.4 mg/g. The total exchange capacity of the resin was 6.6 mmol/g, with a strong base exchange capacity of 3.8 mmol/g, a weak base exchange capacity of 2.8 mmol/g, and an average resin particle size of 580 μm.

Example 4

A method for synthesizing a high exchange-capacity anion exchange resin with dual functional-groups, comprising the steps of:

1) Primary Amination Reaction 5 g of chloromethylated polystyrene-divinylbenzene polymer (degree of polymerization m=3870) was placed into stirred solution of 17 ml anhydrous ethanol and 3 ml chloroform, swell at 20° C. for 3.5 hours, 4.5 g of hexamethylenetetramine was added, the reaction mixture was stirred at 40° C. for 6.5 hours. The polymer was filtered and washed with ethanol. Concentrated hydrochloric acid (37.5% mass percentage) and anhydrous ethanol was mixed into an acid hydrolysis solution, with the concentrated hydrochloric acid volume (ml):anhydrous ethanol volume (ml)=1:2.5. The polymer was added to the acid hydrolysis solution, with the chloromethylated polystyrene-divinylbenzene polymer (g):acid hydrolysis solution (ml)=1:4.5. React at 40° C. for 2.5 hours. The polymer was filtered, washed with water, allowed to transition for 2.5 hours with 1% NaOH solution added to control pH>14, washed with water, and filtered to afford poly(divinylbenzene-vinylbenzyl amine) polymer;

2) Quaternization Reaction

60% 3-chloro-2-hydroxypropyltrimethylammonium chloride aqueous solution and 40% NaOH solution were mixed, the ratio of the two solutions being 8:1 (volume: volume). The poly(divinylbenzene-vinylbenzyl amine) polymer from the step 1) is added into the mixed solution, at the ratio of polymer (g):mixed solution (ml)=1:50, stired at 70° C. for 2 hours. The reaction product was washed with 10% hydrochloric acid and deionized water, dried at 40° C. in vacuum for 12 hours (pressure −0.09 Mpa) to afford the high exchange-capacity anion exchange resin with dual functional-groups.

The synthezied resin has characteristics significantly similar to that from Example 1. The maximum adsorption capacity for nitrate ion was 185.5 mg/g, the maximum adsorption capacity for tannic acid was 481.5 mg/g, and the maximum adsorption capacity for gallic acid was 400.4 mg/g. The total exchange capacity of the resin was 7.1 mmol/g, with a strong base exchange capacity of 4.2 mmol/g, a weak base exchange capacity of 2.9 mmol/g, and an average resin particle size of 590 μm.

Example 5

A method for synthesizing a high exchange-capacity anion exchange resin with dual functional-groups, comprising the steps of:

1) Primary Amination Reaction 5 g of chloromethylated polystyrene-divinylbenzene polymer (degree of polymerization m=4880) was placed into stirred solution of 17 ml anhydrous ethanol and 3 ml chloroform, swell at 20° C. for 3.5 hours, 4.5 g of hexamethylenetetramine was added, the reaction mixture was stirred at 40° C. for 6.5 hours. The polymer was filtered and washed with ethanol. Concentrated hydrochloric acid (37.5% mass percentage) and anhydrous ethanol was mixed into an acid hydrolysis solution, with the concentrated hydrochloric acid volume (ml):anhydrous ethanol volume (ml)=1:2.5. The polymer was added to the acid hydrolysis solution, with the chloromethylated polystyrene-divinylbenzene polymer (g):acid hydrolysis solution (ml)=1:4.5. React at 40° C. for 2.5 hours. The polymer was filtered, washed with water, allowed to transition for 2.5 hours with 1% NaOH solution added to control pH>14, washed with water, and filtered to afford poly(divinylbenzene-vinylbenzyl amine) polymer;

2) Quaternization Reaction

60% 3-chloro-2-hydroxypropyltrimethylammonium chloride aqueous solution and 40% NaOH solution were mixed, the ratio of the two solutions being 9:1 (volume: volume). The poly(divinylbenzene-vinylbenzyl amine) polymer from the step 1) is added into the mixed solution, at the ratio of polymer (g):mixed solution (ml)=1.5:50, stired at 75° C. for 2.5 hours. The reaction product was washed with 20% hydrochloric acid and deionized water, dried at 50° C. in vacuum for 18 hours (pressure −0.085 Mpa) to afford the high exchange-capacity anion exchange resin with dual functional-groups.

The synthezied resin has characteristics significantly similar to that from Example 1. The maximum adsorption capacity for nitrate ion was 187.2 mg/g, the maximum adsorption capacity for tannic acid was 487.1 mg/g, and the maximum adsorption capacity for gallic acid was 406.7 mg/g. The total exchange capacity of the resin was 7.0 mmol/g, with a strong base exchange capacity of 4.2 mmol/g, a weak base exchange capacity of 2.8 mmol/g, and an average resin particle size of 600 μm.

Example 6

A method for synthesizing a high exchange-capacity anion exchange resin with dual functional-groups, comprising the steps of:

1) Primary Amination Reaction 5 g of chloromethylated polystyrene-divinylbenzene polymer (degree of polymerization m=5000) was placed into stirred solution of 17 ml anhydrous ethanol and 3 ml chloroform, swell at 22° C. for 3.5 hours, 4.5 g of hexamethylenetetramine was added, the reaction mixture was stirred at 40° C. for 6.5 hours. The polymer was filtered and washed with ethanol. Concentrated hydrochloric acid (37.5% mass percentage) and anhydrous ethanol was mixed into an acid hydrolysis solution, with the concentrated hydrochloric acid volume (ml):anhydrous ethanol volume (ml)=1:2.5. The polymer was added to the acid hydrolysis solution, with the chloromethylated polystyrene-divinylbenzene polymer (g):acid hydrolysis solution (ml)=1:4.5. React at 40° C. for 2.5 hours. The polymer was filtered, washed with water, allowed to transition for 2.5 hours with 1% NaOH solution added to control pH>14, washed with water, and filtered to afford poly(divinylbenzene-vinylbenzyl amine) polymer;

2) Quaternization Reaction

60% 3-chloro-2-hydroxypropyltrimethylammonium chloride aqueous solution and 40% NaOH solution were mixed, the ratio of the two solutions being 10:1 (volume: volume). The poly(divinylbenzene-vinylbenzyl amine) polymer from the step 1) is added into the mixed solution, at the ratio of polymer (g):mixed solution (ml)=2:50, stired at 80° C. for 3 hours. The reaction product was washed with 30% hydrochloric acid and deionized water, dried at 60° C. in vacuum for 24 hours (pressure −0.08 Mpa) to afford the high exchange-capacity anion exchange resin with dual functional-groups.

The synthezied resin has characteristics significantly similar to that from Example 1. The maximum adsorption capacity for nitrate ion was 184.5 mg/g, the maximum adsorption capacity for tannic acid was 488.3 mg/g, and the maximum adsorption capacity for gallic acid was 395.6 mg/g. The total exchange capacity of the resin was 7.1 mmol/g, with a strong base exchange capacity of 4.1 mmol/g, a weak base exchange capacity of 3.0 mmol/g, and an average resin particle size of 630 μm.

Example 7

A method for synthesizing a high exchange-capacity anion exchange resin with dual functional-groups, comprising the steps of:

1) Primary Amination Reaction 5 g of chloromethylated polystyrene-divinylbenzene polymer (degree of polymerization m=3300) was placed into stirred solution of 20 ml anhydrous ethanol and 4 ml chloroform, swell at 25° C. for 4 hours, 5 g of hexamethylenetetramine was added, the reaction mixture was stirred at 45° C. for 7 hours. The polymer was filtered and washed with ethanol. Concentrated hydrochloric acid (37.5% mass percentage) and anhydrous ethanol was mixed into an acid hydrolysis solution, with the concentrated hydrochloric acid volume (ml):anhydrous ethanol volume (ml)=1:3. The polymer was added to the acid hydrolysis solution, with the chloromethylated polystyrene-divinylbenzene polymer (g): acid hydrolysis solution (ml)=1:5. React at 45° C. for 3 hours. The polymer was filtered, washed with water, allowed to transition for 3 hours with 1% NaOH solution added to control pH>14, washed with water, and filtered to afford poly(divinylbenzene-vinylbenzyl amine) polymer;

2) Quaternization Reaction

60% 3-chloro-2-hydroxypropyltrimethylammonium chloride aqueous solution and 40% NaOH solution were mixed, the ratio of the two solutions being 8:1 (volume: volume). The poly(divinylbenzene-vinylbenzyl amine) polymer from the step 1) is added into the mixed solution, at the ratio of polymer (g):mixed solution (ml)=1:50, stired at 70° C. for 2 hours. The reaction product was washed with 10% hydrochloric acid and deionized water, dried at 40° C. in vacuum for 12 hours (pressure −0.09 Mpa) to afford the high exchange-capacity anion exchange resin with dual functional-groups.

The synthezied resin has characteristics significantly similar to that from Example 1. The maximum adsorption capacity for nitrate ion was 185.5 mg/g, the maximum adsorption capacity for tannic acid was 480.1 mg/g, and the maximum adsorption capacity for gallic acid was 387.7 mg/g. The total exchange capacity of the resin was 7.3 mmol/g, with a strong base exchange capacity of 4.2 mmol/g, a weak base exchange capacity of 3.1 mmol/g, and an average resin particle size of 590 μm.

Example 8

A method for synthesizing a high exchange-capacity anion exchange resin with dual functional-groups, comprising the steps of:

1) Primary Amination Reaction 5 g of chloromethylated polystyrene-divinylbenzene polymer (degree of polymerization m=4150) was placed into stirred solution of 20 ml anhydrous ethanol and 4 ml chloroform, swell at 25° C. for 4 hours, 5 g of hexamethylenetetramine was added, the reaction mixture was stirred at 45° C. for 7 hours. The polymer was filtered and washed with ethanol. Concentrated hydrochloric acid (37.5% mass percentage) and anhydrous ethanol was mixed into an acid hydrolysis solution, with the concentrated hydrochloric acid volume (ml):anhydrous ethanol volume (ml)=1:3. The polymer was added to the acid hydrolysis solution, with the chloromethylated polystyrene-divinylbenzene polymer (g): acid hydrolysis solution (ml)=1:5. React at 45° C. for 3 hours. The polymer was filtered, washed with water, allowed to transition for 3 hours with 1% NaOH solution added to control pH>14, washed with water, and filtered to afford poly(divinylbenzene-vinylbenzyl amine) polymer;

2) Quaternization Reaction

60% 3-chloro-2-hydroxypropyltrimethylammonium chloride aqueous solution and 40% NaOH solution were mixed, the ratio of the two solutions being 9:1 (volume: volume). The poly(divinylbenzene-vinylbenzyl amine) polymer from the step 1) is added into the mixed solution, at the ratio of polymer (g):mixed solution (ml)=1.5:50, stired at 75° C. for 2.5 hours. The reaction product was washed with 20% hydrochloric acid and deionized water, dried at 50° C. in vacuum for 18 hours (pressure −0.085 Mpa) to afford the high exchange-capacity anion exchange resin with dual functional-groups.

The synthezied resin has characteristics significantly similar to that from Example 1. The maximum adsorption capacity for nitrate ion was 187.2 mg/g, the maximum adsorption capacity for tannic acid was 478.2 mg/g, and the maximum adsorption capacity for gallic acid was 384.6 mg/g. The total exchange capacity of the resin was 7.3 mmol/g, with a strong base exchange capacity of 4.3 mmol/g, a weak base exchange capacity of 3.0 mmol/g, and an average resin particle size of 620 μm.

Example 9

A method for synthesizing a high exchange-capacity anion exchange resin with dual functional-groups, comprising the steps of:

1) Primary Amination Reaction 5 g of chloromethylated polystyrene-divinylbenzene polymer (degree of polymerization m=3740) was placed into stirred solution of 20 ml anhydrous ethanol and 4 ml chloroform, swell at 25° C. for 4 hours, 5 g of hexamethylenetetramine was added, the reaction mixture was stirred at 45° C. for 7 hours. The polymer was filtered and washed with ethanol. Concentrated hydrochloric acid (37.5% mass percentage) and anhydrous ethanol was mixed into an acid hydrolysis solution, with the concentrated hydrochloric acid volume (ml):anhydrous ethanol volume (ml)=1:3. The polymer was added to the acid hydrolysis solution, with the chloromethylated polystyrene-divinylbenzene polymer (g): acid hydrolysis solution (ml)=1:5. React at 45° C. for 3 hours. The polymer was filtered, washed with water, allowed to transition for 3 hours with 1% NaOH solution added to control pH>14, washed with water, and filtered to afford poly(divinylbenzene-vinylbenzyl amine) polymer;

2) Quaternization Reaction

60% 3-chloro-2-hydroxypropyltrimethylammonium chloride aqueous solution and 40% NaOH solution were mixed, the ratio of the two solutions being 10:1 (volume: volume). The poly(divinylbenzene-vinylbenzyl amine) polymer from the step 1) is added into the mixed solution, at the ratio of polymer (g):mixed solution (ml)=2:50, stired at 75° C. for 3 hours. The reaction product was washed with 30% hydrochloric acid and deionized water, dried at 60° C. in vacuum for 24 hours (pressure −0.08 Mpa) to afford the high exchange-capacity anion exchange resin with dual functional-groups.

The synthezied resin has characteristics significantly similar to that from Example 1. The maximum adsorption capacity for nitrate ion was 184.5 mg/g, the maximum adsorption capacity for tannic acid was 466.9 mg/g, and the maximum adsorption capacity for gallic acid was 376.7 mg/g. The total exchange capacity of the resin was 7.0 mmol/g, with a strong base exchange capacity of 3.9 mmol/g, a weak base exchange capacity of 3.1 mmol/g, and an average resin particle size of 610 μm.

Example 10

A method for synthesizing a high exchange-capacity anion exchange resin with dual functional-groups, comprising the steps of:

1) Primary Amination Reaction 5 g of chloromethylated polystyrene-divinylbenzene polymer (degree of polymerization m=4560) was placed into stirred solution of 15 ml anhydrous ethanol and 2 ml chloroform, swell at 20° C. for 4 hours, 4 g of hexamethylenetetramine was added, the reaction mixture was stirred at 35° C. for 6 hours. The polymer was filtered and washed with ethanol. Concentrated hydrochloric acid (37.5% mass percentage) and anhydrous ethanol was mixed into an acid hydrolysis solution, with the concentrated hydrochloric acid volume (ml):anhydrous ethanol volume (ml)=1:2. The polymer was added to the acid hydrolysis solution, with the chloromethylated polystyrene-divinylbenzene polymer (g): acid hydrolysis solution (ml)=1:5. React at 45° C. for 2 hours. The polymer was filtered, washed with water, allowed to transition for 3 hours with 1% NaOH solution added to control pH>14, washed with water, and filtered to afford poly(divinylbenzene-vinylbenzyl amine) polymer;

2) Quaternization Reaction

60% 3-chloro-2-hydroxypropyltrimethylammonium chloride aqueous solution and 40% NaOH solution were mixed, the ratio of the two solutions being 8:1 (volume: volume). The poly(divinylbenzene-vinylbenzyl amine) polymer from the step 1) is added into the mixed solution, at the ratio of polymer (g):mixed solution (ml)=1.5:50, stired at 75° C. for 2.5 hours. The reaction product was washed with 20% hydrochloric acid and deionized water, dried at 50° C. in vacuum for 18 hours (pressure −0.085 Mpa) to afford the high exchange-capacity anion exchange resin with dual functional-groups.

The synthezied resin has characteristics significantly similar to that from Example 1. The maximum adsorption capacity for nitrate ion was 171.7 mg/g, the maximum adsorption capacity for tannic acid was 459.6 mg/g, and the maximum adsorption capacity for gallic acid was 375.4 mg/g. The total exchange capacity of the resin was 6.3 mmol/g, with a strong base exchange capacity of 3.8 mmol/g, a weak base exchange capacity of 2.5 mmol/g, and an average resin particle size of 650 μm.

Example 11

A method for synthesizing a high exchange-capacity anion exchange resin with dual functional-groups, comprising the steps of:

1) Primary Amination Reaction 5 g of chloromethylated polystyrene-divinylbenzene polymer (degree of polymerization m=3890) was placed into stirred solution of 15 ml anhydrous ethanol and 2 ml chloroform, swell at 20° C. for 4 hours, 4 g of hexamethylenetetramine was added, the reaction mixture was stirred at 35° C. for 6 hours. The polymer was filtered and washed with ethanol. Concentrated hydrochloric acid (37.5% mass percentage) and anhydrous ethanol was mixed into an acid hydrolysis solution, with the concentrated hydrochloric acid volume (ml):anhydrous ethanol volume (ml)=1:3. The polymer was added to the acid hydrolysis solution, with the chloromethylated polystyrene-divinylbenzene polymer (g): acid hydrolysis solution (ml)=1:4. React at 45° C. for 3 hours. The polymer was filtered, washed with water, allowed to transition for 2 hours with 1% NaOH solution added to control pH>14, washed with water, and filtered to afford poly(divinylbenzene-vinylbenzyl amine) polymer;

2) Quaternization Reaction

60% 3-chloro-2-hydroxypropyltrimethylammonium chloride aqueous solution and 40% NaOH solution were mixed, the ratio of the two solutions being 9:1 (volume: volume). The poly(divinylbenzene-vinylbenzyl amine) polymer from the step 1) is added into the mixed solution, at the ratio of polymer (g):mixed solution (ml)=2:50, stired at 80° C. for 3 hours. The reaction product was washed with 30% hydrochloric acid and deionized water, dried at 60° C. in vacuum for 24 hours (pressure −0.08 Mpa) to afford the high exchange-capacity anion exchange resin with dual functional-groups.

The synthezied resin has characteristics significantly similar to that from Example 1. The maximum adsorption capacity for nitrate ion was 179.1 mg/g, the maximum adsorption capacity for tannic acid was 466.5 mg/g, and the maximum adsorption capacity for gallic acid was 383.7 mg/g. The total exchange capacity of the resin was 6.5 mmol/g, with a strong base exchange capacity of 3.8 mmol/g, a weak base exchange capacity of 2.7 mmol/g, and an average resin particle size of 620 μm.

Example 12

A method for synthesizing a high exchange-capacity anion exchange resin with dual functional-groups, comprising the steps of:

1) Primary Amination Reaction 5 g of chloromethylated polystyrene-divinylbenzene polymer (degree of polymerization m=3470) was placed into stirred solution of 17 ml anhydrous ethanol and 3 ml chloroform, swell at 20° C. for 4 hours, 4.5 g of hexamethylenetetramine was added, the reaction mixture was stirred at 40° C. for 6.5 hours. The polymer was filtered and washed with ethanol. Concentrated hydrochloric acid (37.5% mass percentage) and anhydrous ethanol was mixed into an acid hydrolysis solution, with the concentrated hydrochloric acid volume (ml):anhydrous ethanol volume (ml)=1:2.5. The polymer was added to the acid hydrolysis solution, with the chloromethylated polystyrene-divinylbenzene polymer (g): acid hydrolysis solution (ml)=1:5. React at 45° C. for 3 hours. The polymer was filtered, washed with water, allowed to transition for 2.5 hours with 1% NaOH solution added to control pH>14, washed with water, and filtered to afford poly(divinylbenzene-vinylbenzyl amine) polymer;

2) Quaternization Reaction

60% 3-chloro-2-hydroxypropyltrimethylammonium chloride aqueous solution and 40% NaOH solution were mixed, the ratio of the two solutions being 10:1 (volume: volume). The poly(divinylbenzene-vinylbenzyl amine) polymer from the step 1) is added into the mixed solution, at the ratio of polymer (g):mixed solution (ml)=1:50, stired at 70° C. for 2 hours. The reaction product was washed with 10% hydrochloric acid and deionized water, dried at 40° C. in vacuum for 12 hours (pressure −0.09 Mpa) to afford the high exchange-capacity anion exchange resin with dual functional-groups.

The synthezied resin has characteristics significantly similar to that from Example 1. The maximum adsorption capacity for nitrate ion was 189.5 mg/g, the maximum adsorption capacity for tannic acid was 477.5 mg/g, and the maximum adsorption capacity for gallic acid was 398.8 mg/g. The total exchange capacity of the resin was 7.5 mmol/g, with a strong base exchange capacity of 4.3 mmol/g, a weak base exchange capacity of 3.2 mmol/g, and an average resin particle size of 610 μm.

What is claimed is:

1. A high exchange-capacity anion exchange resin with dual functional-groups, comprising:
   a matrix of chloromethylated polystyrene-divinylbenzene polymer;
   a weak base anion exchange group formed by grafting a primary amine onto the matrix;
   a strong base anion exchange group formed by grafting 3-chloro-2-hydroxypropyltrimethylammonium chloride onto the primary amine, wherein the resin is of formula I:

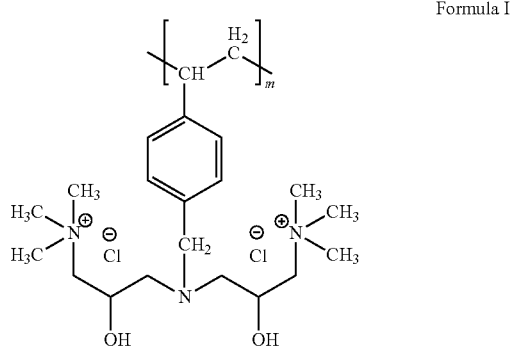

Formula I wherein m represents a degree of polymerization and is within the range of 3000 to 5000.

2. The high exchange-capacity anion exchange resin with dual functional-groups according to claim 1, wherein a total exchange capacity of the anion exchange resin is 6.3-7.9 mmol/g, wherein a strong base exchange capacity is 3.8-4.7 mmol/g, a weak base exchange capacity is 2.5-3.2 mmol/g, and the average particle diameter of the resin is 550-650 μm.

3. A method for synthesizing a high exchange-capacity anion exchange resin with dual functional-groups according to claim 1, comprising:
   (1) carrying out a primary amination reaction, which comprises dissolving chloromethylated polystyrene-divinylbenzene polymer to swell in a mixed solution of absolute ethanol and choroform, adding hexamethylenetetramine, stirring the reaction mixture at 35-45° C. for 6-7 hours; filtering out the polymer, washing the polymer with ethanol, and placing the polymer into a mixed acid solution of concentrated hydrochloric acid-absolute ethanol at a ratio of chloromethylated polystyrene-divinylbenzene polymer (g):mixed acid solution (ml)=1:4-5, reacting at 35-45° C. for 2-3 hours, filtering out the polymerized product, washing with water, transitioning in a NaOH solution for 2-3 hours washing with water, and filtering to obtain poly(divinylbenzene-vinylbenzyl amine) polymers; and
   (2) carrying out a quaternization reaction, which comprises adding the poly(divinylbenzene-vinylbenzyl amine) polymers from step (1) to a mixed solution formulation of 3-chloro-2-hydroxypropyltrimethylammonium chloride aqueous solution and NaOH at a ratio of poly(divinylbenzene-vinylbenzyl amine) polymers (g):the mixed solution formulation (ml)=1-2:50, stirring the reaction mixture at 70-80° C. for 2-3 hours, washing the product with 10-30% HCl solution and deionized water, drying in vacuum at 40-60° C. to obtain the high exchange-capacity anion exchange resin with dual functional-groups.

4. The method for synthesizing the high exchange-capacity anion exchange resin with dual functional-groups according to claim 3, wherein, in step (1), chloromethylated polystyrene-divinylbenzene polymer is dissolved to swell in the mixed solution of absolute ethanol and chloroform at 20-25° C. for 3-4 hours at a ratio of chloromethylated polystyrene-divinylbenzene polymer (g):absolute ethanol (ml):chloroform (ml):hexamethylenetetramine (g) of 5:15-20:2-4:4-5.

5. The method for synthesizing the high exchange-capacity anion exchange resin with dual functional-groups according to claim 3, wherein the mixed acid solution of concentrated hydrochloric acid-absolute ethanol in the step (1) is a mixed acid solution formulation of 37.5% (mass %) concentrated HCl mixed with absolute ethanol at a ration of concentrated HCl (m1):absolute ethanol (ml) in the range of 1:2-3.

6. The method for synthesizing the high exchange-capacity anion exchange resin with dual functional-groups according to claim 3, wherein the NaOH solution for transitioning has a concentration of 1% (mass %).

7. The method for synthesizing the high exchange-capacity anion exchange resin with dual functional-groups according to claim 3, wherein the 3-chloro-2-hydroxypropyltrimethylammonium chloride aqueous solution in the step (2) is 60% (mass %), the NaOH solution is 40% (mass %), and the ratio between the 3-chloro-2-hydroxypropyltrimethylammonium chloride aqueous solution and the NaOH solution is 8-10:1 in volume.

8. The method for synthesizing the high exchange-capacity anion exchange resin with dual functional-groups according to claim 3, wherein the vacuum drying step is performed under the pressure of −0.09 to -0.08 MPa for 12-24 hours.

\* \* \* \* \*